United States Patent
Humburg et al.

(10) Patent No.: US 10,024,722 B2
(45) Date of Patent: Jul. 17, 2018

(54) TEMPERATURE DETECTION DEVICE FOR A VEHICLE HEATER

(71) Applicant: Eberspächer Climate Control Systems GmbH & Co. KG, Esslingen (DE)

(72) Inventors: Michael Humburg, Göppingen (DE); Klaus Kennerknecht, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 258 days.

(21) Appl. No.: 14/848,813

(22) Filed: Sep. 9, 2015

(65) Prior Publication Data

US 2016/0069749 A1     Mar. 10, 2016

(30) Foreign Application Priority Data

Sep. 10, 2014   (DE) .......... 10 2014 218 113

(51) Int. Cl.
| | | |
|---|---|---|
| *G01J 5/00* | (2006.01) | |
| *G01J 5/10* | (2006.01) | |
| *B60H 1/00* | (2006.01) | |
| *G01J 5/02* | (2006.01) | |
| *G01J 5/08* | (2006.01) | |

(52) U.S. Cl.
CPC ............ *G01J 5/10* (2013.01); *B60H 1/00642* (2013.01); *G01J 5/0205* (2013.01); *G01J 5/0815* (2013.01); *G01J 5/0868* (2013.01); *G01J 5/0887* (2013.01)

(58) Field of Classification Search
None
See application file for complete search history.

(56) References Cited

U.S. PATENT DOCUMENTS

| | | | |
|---|---|---|---|
| 3,626,758 A | 12/1971 | Stewart et al. | |
| 2007/0018106 A1* | 1/2007 | Zhevelev | ........... G01J 5/08 250/353 |
| 2009/0206264 A1* | 8/2009 | Twiney | ........... G01J 5/041 250/353 |
| 2013/0278226 A1 | 10/2013 | Cong et al. | |

FOREIGN PATENT DOCUMENTS

| | | |
|---|---|---|
| DE | 10 2010 004 305 B3 | 5/2011 |
| JP | H08-54 285 A | 2/1996 |

OTHER PUBLICATIONS

European Search Report dated Jan. 28, 2016.

* cited by examiner

*Primary Examiner* — Erica Lin
(74) *Attorney, Agent, or Firm* — McGlew and Tuttle, P.C.

(57) ABSTRACT

A temperature detection device (10) for a vehicle heater detects a fluid temperature. The device includes a temperature sensor (12) as well as a contact element (14) with a first side (16), around which the fluid can flow in at least some sections, and with a second side (18) facing away from the first side (16). The temperature sensor (12) is configured as a radiation sensor. The contact element (14) is arranged relative to the temperature sensor (12) such that at least a part of the radiation emitted from the second side (18) of the contact element (14) can be received by the temperature sensor (12).

17 Claims, 3 Drawing Sheets

TEMPERATURE DETECTION DEVICE FOR A VEHICLE HEATER

CROSS REFERENCE TO RELATED APPLICATIONS

This application claims the benefit of priority under 35 U.S.C. § 119 of German Patent Application 10 2014 218 113.5 filed Sep. 10, 2014, the entire contents of which are incorporated herein by reference.

FIELD OF THE INVENTION

The present invention pertains to a temperature detection device for a vehicle heater for detecting a fluid temperature.

BACKGROUND OF THE INVENTION

There are, in principle, various possibilities for detecting a temperature of a fluid being used in a vehicle heater, for example, by measuring an electric resistance showing a significantly temperature-dependent behavior in a relevant temperature range. Moreover, it is possible to detect the temperature of a fluid on the basis of the radiation emitted by this fluid. This measurement method is based on the Stefan-Boltzmann law, according to which the radiation output emitted by a body is proportional to the fourth power of T. However, an accurate temperature detection on the basis of this measurement method is only possible if the radiation received can be unambiguously assigned to the fluid being measured, because radiation emitted by the area surrounding the fluid may otherwise considerably distort the temperature determination. This happens especially if the fluid is a gas, because this has a substantially lower density than the surrounding area.

SUMMARY OF THE INVENTION

In light of this problem, an object of the present invention is to provide a temperature detection device for a vehicle heater, with which an accurate detection of the fluid temperature is possible.

According to the present invention, this object is accomplished by a temperature detection device for a vehicle heater for detecting a fluid temperature, comprising a temperature sensor as well as a contact element with a first side, around (over and about) which the fluid can flow in at least some sections, and with a second side facing away from the first side. The temperature sensor is designed as (configured) a radiation sensor. The contact element is arranged relative to the temperature sensor such that at least a part of the radiation emitted by the second side of the contact element can be received by the temperature sensor.

An indirect temperature detection is achieved with the temperature detection device according to the present invention by the use of a contact element, around one side of which the fluid to be measured can flow. The fluid flowing around the first side is in thermal contact with the contact element, i.e., it transfers heat to this or removes heat from this. As a result, a thermal equilibrium becomes established between the fluid and the contact element, as a consequence of which the contact element assumes the temperature of the fluid and emits radiation characteristic of this temperature. In addition, the radiation emitted from the area surrounding the fluid is shielded by the use of a contact element, which makes it possible to accurately determine the fluid temperature.

Provisions may be made in a variant of the present invention for the second side of the contact element to comprise an emission area emitting radiation in the direction of the temperature sensor. Such an emission area may have a concave shape and especially the shape of a segment of a spherical shell, whose center is located in the area of the temperature sensor. It can be ensured hereby that a radiation intensity sufficient for an accurate temperature detection is emitted in the direction of the temperature sensor.

To make it possible to further increase the radiation emitted in the direction of the temperature sensor, provisions may, furthermore, be made for the emission area to have a higher surface roughness in at least some areas relative to the areas of the second side of the contact element, which latter areas are different from the emission area. It can be ensured by an increased surface roughness in the area of the emission area relative to areas of the second side, which latter areas are different from this, that a radiation emission will take place preferably by the emission area and hence in the direction of the temperature sensor, because the degree of total reflection is reduced in this area compared to the areas of the second side with lower surface roughness, which latter areas are different from the emission area.

To make it possible to ensure that radiation is received mainly from the emission area, provisions may be made in a variant of the present invention for a shielding having a window being associated with the temperature sensor. The window is arranged relative to the temperature sensor and to the contact element such that the window transmits radiation emitted essentially only by the emission area to the temperature sensor. The shielding may be made, for example, of a polished metal plate. This is characterized by an emissivity of about 0.03. The emissivity indicates the radiation output emitted at a certain temperature relative to the radiation output emitted by a completely black body at the same temperature. An emissivity of 0.03 consequently means that the radiation output emitted by a polished metal plate only corresponds to about 3% of the radiation output emitted by a completely black body at equal temperature.

To make it possible to achieve an especially efficient energy transfer from the fluid to the contact element, provisions may be made in a variant of the present invention for the fluid to be measured to also be able to flow around the second side of the contact element.

It is advantageous for an especially accurate temperature measurement to use a sensor whose sensitivity range is tuned to the emission wavelength range in which the spectral radiation intensity has its maximum. The temperature to be measured is below 50° C. in vehicle heaters. The spectral radiation intensity has its maximum in this temperature range in the middle infrared (MIR) range. It is therefore advantageous to use an infrared sensor as the temperature sensor.

Provisions may be made in a variant of the present invention for the contact element to be made preferably of a black plastic. Plastic, especially black plastic, is characterized by a high emissivity of up to 0.9. Black plastic consequently emits a substantially higher radiation output than, for example, polished plate and therefore makes possible an accurate and rapid temperature detection. Because of the lower thermal conductivity compared to that of metal, a contact element made of plastic also contributes, in principle, to rapid temperature changes of the fluid not being detected. This causes, for example, that short-term temperature variations, caused by the opening of a door or a window, will not essentially be detected in a vehicle. This circumstance offers the advantage that the operation of the heater does not have to be briefly changed over by the regulating electronic unit to compensate these temperature variations.

To make it possible to achieve an especially efficient energy transfer from the fluid to be measured to the contact element, provisions may be made in a variant of the present invention for the contact element to have a contact surface formation, preferably a projection, on the first side. The contact surface between the contact element and the fluid to be measured can be increased by a corresponding contact surface formation compared to a contact element not having a contact surface formation. Energy can be efficiently exchanged between the flowing fluid and the contact element due to the enlarged surface of the contact element, so that the contact element can be brought to a thermal equilibrium with the fluid to be detected within a short time.

To make it possible to obtain an especially compact design, provisions may, furthermore, be made for the temperature sensor to be provided on a housing of a control device, wherein the contact element is preferably provided by a part of the housing. On the one hand, an additional housing for the temperature sensor can be eliminated, on the one hand, according to this variant of the present invention. On the other hand, such a design also offers the possibility of directly integrating the temperature sensor in the board of the control device which contributes to an, on the whole, even more compact design.

To minimize the effect of the heat generated by circuit components during the operation on measurement of the fluid temperature, provisions may, furthermore, be made for the contact element to be connected to the housing by webs. These webs may make it possible that only a small fraction of the thermal output dissipated within the housing of the control device will be transmitted to the contact element, so that distortion of the fluid temperature measurement is limited.

To make it nevertheless possible to ensure a closed housing in order to prevent foreign bodies, e.g., dust, from entering, provisions may, furthermore, be made for the housing to have a window element, which is arranged between the temperature sensor and the contact element and is transparent for radiation to be detected.

The present invention pertains, furthermore, to a vehicle heater, comprising a temperature detection device according to the present invention. This device may comprise a control device accommodated in a housing, wherein the temperature sensor is provided on the housing and wherein the contact element is provided on the housing or/and is provided by this.

The present invention will be explained in more detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
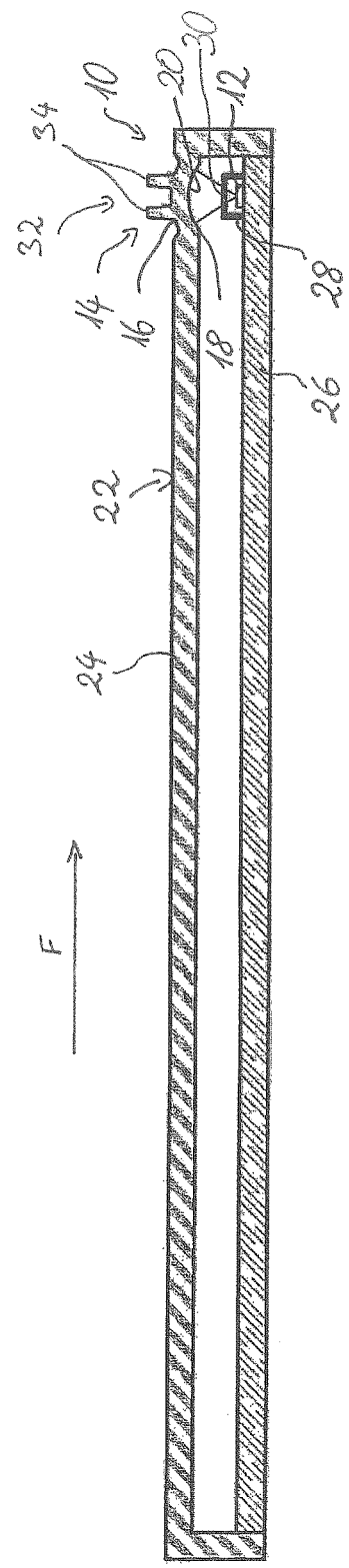
FIG. 1 is a cross-sectional view through a temperature detection device.
Figure 2:
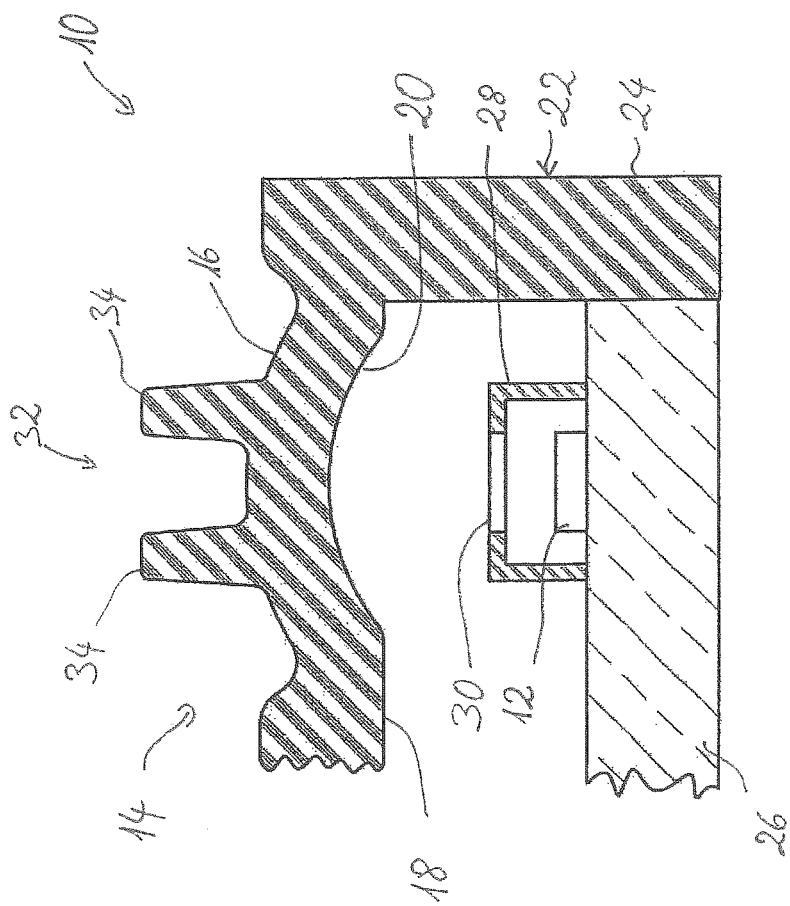
FIG. 2 is a cut away sectional view of the temperature detection device shown in FIG. 1.

Referring to the drawings, FIGS. 1 and 2 show a first embodiment of a temperature detection device 10 for a vehicle heater for detecting a fluid temperature. The fluid, whose temperature is to be detected, may be, for example, combustion air to be returned to a vehicle heater. The fluid flow direction is schematically indicated by an arrow F in FIG. 1. This direction of flow is, however, only an example and may be, in principle, arbitrary as long as the heat transfer can take place between the flowing fluid and the temperature detection device 10.

The temperature detection device 10 comprises a temperature sensor 12 as well as a contact element 14. The contact element 14 comprises, in turn, a first side 16, around which the flowing fluid can flow in at least some sections, as well as a second side 18 facing away from the first side 16. The temperature sensor 12 is designed as a radiation sensor and the contact element 14 is arranged relative to the temperature sensor 12 such that at least a part of the radiation emitted from the second side 18 of the contact element 14 can be detected by the temperature sensor 12.

The second side 18 of the contact element 14 has an emission area 20 emitting in the direction of the temperature sensor 12. This emission area 20 has a concave shape in this embodiment, the radiation emitted orthogonally to any desired surface segment of the emission area 20 being emitted in the direction of the temperature sensor 12. An especially efficient radiation detection can be ensured in this manner. It may, furthermore, be contemplated in this connection that the emission area 20 can be provided, in at least some areas, with a higher surface roughness compared to areas of the second side 18 of the contact element 14, which said areas are different from the emission area 20. The degree of total reflection of the radiation to be detected, which takes place in the contact element 14, can be reduced in this manner compared to areas of the second side with lower surface roughness, which said areas are different from the emission area, so that radiation will then be emitted preferably by the emission area 20 and hence in the direction of the temperature sensor 12.

The temperature sensor 12 is provided on a housing 22 of a control device in an embodiment shown in FIGS. 1 and 2. This housing 22 has, in the schematic representation shown in FIGS. 1 and 2, a cover 24 as well as a printed circuit board 26, on which the temperature sensor 12 is arranged directly and on which additional circuit components (not shown) of the control device may be provided. As is shown in FIGS. 1 and 2, the contact element 14 is provided by a part of the cover 24 of the housing 22.

To make it possible in this connection to avoid radiation that is emitted by areas of the housing 22 that are different from the emission area 20 from being received by the temperature sensor 12, which would inevitably lead to a distortion of the fluid temperature measurement, a shielding 28 is associated with the temperature sensor 12 shown in FIGS. 1 and 2. The shielding 28 has a window 30, which is arranged relative to the temperature sensor 12 and the contact element 14 such that it essentially lets through essentially only radiation emitted from the emission area 20 to the temperature sensor 12. The shielding 28 may be made, for example, from polished plate, which has an emissivity of about 0.03.

Contrary to the shielding 28, the contact element 14 is made of a black plastic. This has an emissivity greater than 0.9, which in turn contributes to a high spectral radiation intensity in the relevant wavelength range and therefore also to a very accurate and rapid temperature measurement. Because of the low thermal conductivity compared to that of a metal, a contact element made of plastic also contributes in principle to rapid temperature changes of the fluid not being detected. This allows, for example, short-term temperature variations, due to the opening of a door or a window in a vehicle, to essentially not be detected. This circumstance offers the advantage that the operation of the heater does not have to be changed over briefly by the regulating electronic unit in order to compensate these short-term temperature variations.

To make it possible to ensure an efficient temperature transfer between the fluid and the first side 16 of the contact element 14, the contact element 14 has a contact surface formation 32 on the first side 16. In the exemplary embodiment being shown, this is comprised of projections 34. Two projections 34 are provided in this case merely as an example, but the number of projections 34 is not limited to two and the number of projections 34 may be, in principle, arbitrary. A globally larger contact surface is made available by this contact surface formation 32 between the contact element 14 and the fluid compared to a smooth first side 16.

Depending on the temperature of the emitting body, the spectral radiation intensity has a maximum at a wavelength that is characteristic of the temperature of the body. The temperatures to be detected are in the range below 50° C. in this case. The maximum is in the middle infrared range in this temperature range. The temperature sensor 12 is designed for this reason as an infrared sensor.

Figure 3:
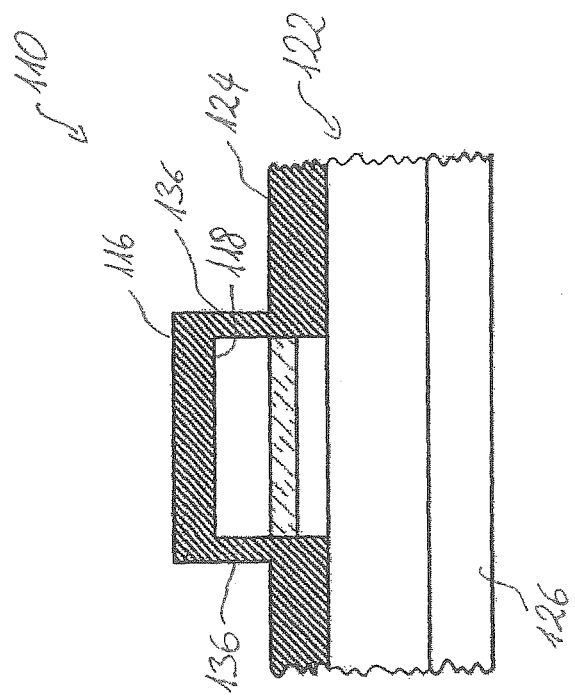
FIG. 3 is a cut away sectional view of an alternative embodiment of the temperature detection device shown in FIGS. 1 and 2.
Figure 4:
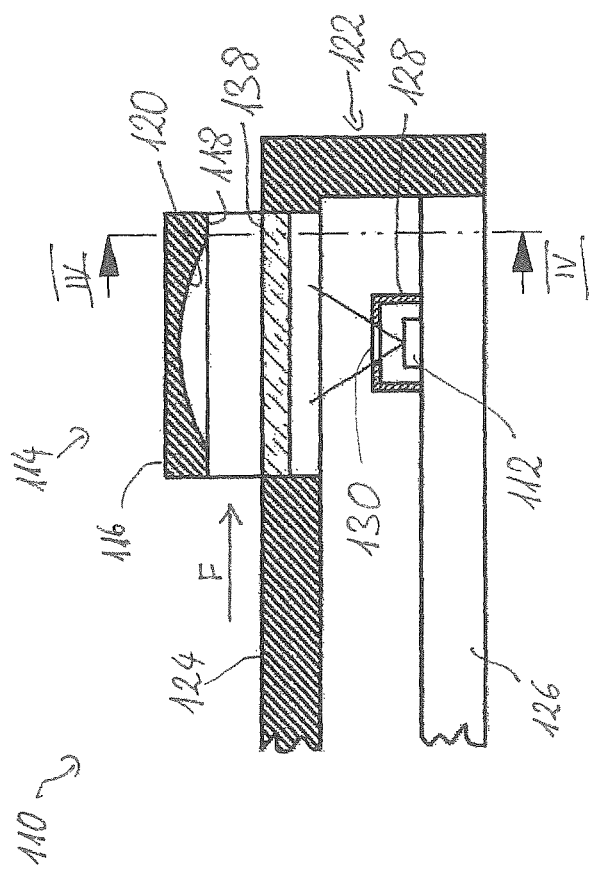
FIG. 4 is a cut away sectional view of the temperature detection device shown in FIG. 3 in the direction of line IV-IV.

With reference to FIGS. 3 and 4, a second embodiment will be described below, but only insofar as it differs from the first embodiment, to the description of which reference is expressly made otherwise. Components identical or functionally identical to those in the first embodiment are designated by the same reference numbers, but increased by the number 100.

The temperature detection device 110 according to the second embodiment comprises a temperature sensor 112 provided on a housing 122 of a control device. Similarly to the first embodiment, the housing 122 comprises a cover 124 as well as a printed circuit board 126, on which the temperature sensor 112 is directly provided. The contact element 114 with a first side 116 and with a second side 118 comprises an emission area 120 in the second embodiment as well. Contrary to the first embodiment, the fluid can flow around both the first side 116 and the second side 118 of the contact element 114 in the second embodiment. An especially efficient energy transfer can be ensured in this manner between the fluid and the contact element 114, and it is possible, moreover, to eliminate a contact surface formation provided in the first embodiment.

The contact element 114 is provided by a part of the housing 122 in the second embodiment as well. Contrary to the first embodiment, the contact element 114 is, however, connected by webs 136 to the cover 124. The thermal conductivity between the contact element 114 and the rest of the housing 122 can be reduced by this web construction compared to the first embodiment, so that a heat generated, for example, by electronic power components within the housing 122 is transferred with reduced effect to the contact element 114 compared to other parts of the cover 124. High accuracy of measurement can be ensured in this manner.

To make it possible to prevent in this embodiment foreign substances being introduced by the fluid to be measured into the housing, a window element 138, which is transparent to the radiation to be measured, is provided according to this embodiment between the contact element 114 and the temperature 112.

The explanations given for the first embodiment otherwise apply to the second embodiment shown in FIGS. 3 and 4 as well.

While specific embodiments of the invention have been shown and described in detail to illustrate the application of the principles of the invention, it will be understood that the invention may be embodied otherwise without departing from such principles.

What is claimed is:

1. A temperature detection device for a vehicle heater for detecting a fluid temperature, the temperature detection device comprising:
a temperature sensor; and
a contact element with a first side, around which the fluid can flow in at least some sections, and with a second side facing away from the first side, wherein the temperature sensor is configured as a radiation sensor and wherein the contact element is arranged relative to the temperature sensor such that at least a part of the radiation emitted from the second side of the contact element can be received by the temperature sensor, wherein the contact element has a contact surface formation comprising a projection on the first side.

2. A temperature detection device in accordance with claim 1, wherein the second side of the contact element comprises an emission area emitting radiation in the direction of the temperature sensor.

3. A temperature detection device in accordance with claim 2, wherein the emission area has a greater surface roughness compared to other areas of the second side of the contact element, which said other areas are different from the emission area.

4. A temperature detection device in accordance with claim 2, further comprising a shielding having a window associated with the temperature sensor, wherein the window is arranged relative to the temperature sensor and relative to the contact element such that the window lets through essentially only radiation emitted from the emission area to the temperature sensor.

5. A temperature detection device in accordance with claim 1, wherein the fluid can flow around the second side of the contact element.

6. A temperature detection device in accordance with claim 1, wherein the temperature sensor is an infrared sensor.

7. A temperature detection device in accordance with claim 1, wherein the contact element is made of a black plastic.

8. A temperature detection device in accordance with claim 1, wherein:
the temperature sensor is provided on a housing of a control device; and
the contact element is provided by a part of the housing.

9. A temperature detection device in accordance with claim 8, wherein the contact element is connected to the housing by webs.

10. A temperature detection device in accordance with claim 8, wherein the housing has a window element arranged between the temperature sensor and the contact element and the window element is transparent for radiation to be detected.

11. A vehicle heater comprising:
a temperature detection device comprising:
a temperature sensor comprising an infrared sensor; and
a contact element with a first side, around which the fluid can flow in at least some sections, and with a second side facing away from the first side, wherein the temperature sensor is configured as a radiation sensor and wherein the contact element is arranged relative to the temperature sensor such that at least a part of the radiation emitted from the second side of the contact element can be received by the temperature sensor, the second side of the contact element comprising an emission area emitting radiation in the direction of the temperature sensor, the contact element comprising black plastic, the contact element having a contact surface formation comprising a projection on the first side.

12. A vehicle heater in accordance with claim 11, further comprising a control device accommodated in a housing, wherein the temperature sensor is provided on the housing and wherein the contact element is provided on the housing or forms a portion of the housing.

13. A vehicle heater in accordance with claim 11, wherein the emission area has a greater surface roughness compared to an adjacent area of the second side of the contact element.

14. A vehicle heater in accordance with claim 11, further comprising a shielding having a window associated with the temperature sensor, wherein the window is aligned with the emission area allowing essentially only radiation emitted from the emission area to the temperature sensor.

15. A vehicle heater in accordance with claim 11, wherein the fluid can flow around the second side of the contact element.

16. A vehicle heater in accordance with claim 11, wherein:
the temperature sensor is provided on a housing of the control device; and
the contact element is provided by a part of the housing.

17. A vehicle heater in accordance with claim 16, wherein the housing has a window element arranged between the temperature sensor and the contact element and the window element is transparent for radiation to be detected.

* * * * *